(12) United States Patent
Pywell et al.

(10) Patent No.: US 8,948,962 B2
(45) Date of Patent: Feb. 3, 2015

(54) TOUCH SENSITIVE CONTROL FOR A LATCH MECHANISM

(75) Inventors: James F. Pywell, Shelby Township, MI (US); Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1103 days.

(21) Appl. No.: 12/796,172

(22) Filed: Jun. 8, 2010

(65) Prior Publication Data

US 2011/0301809 A1 Dec. 8, 2011

(51) Int. Cl.
*B60N 2/02* (2006.01)
*G06F 7/00* (2006.01)
*G06F 17/00* (2006.01)

(52) U.S. Cl.
CPC .................................. *B60N 2/0228* (2013.01)
USPC ........ 701/36; 701/49; 297/378.12; 297/463.1

(58) Field of Classification Search
None
See application file for complete search history.

(56) References Cited

U.S. PATENT DOCUMENTS

| | | | | |
|---|---|---|---|---|
| 5,733,008 | A * | 3/1998 | Tame ....................... | 297/378.11 |
| 5,859,593 | A * | 1/1999 | Takemura et al. ........... | 340/3.43 |
| 6,237,994 | B1 * | 5/2001 | Bentley et al. ................ | 297/118 |
| 6,243,635 | B1 * | 6/2001 | Swan et al. .................... | 701/49 |
| 6,352,310 | B1 * | 3/2002 | Schmidt et al. ......... | 297/378.12 |
| 7,309,104 | B2 * | 12/2007 | Browne et al. ............. | 297/284.1 |
| 7,432,459 | B2 * | 10/2008 | Stoschek et al. ............. | 200/5 R |
| 7,851,719 | B2 * | 12/2010 | Dzioba ........................ | 200/600 |
| 2001/0033223 | A1 * | 10/2001 | Zagler .......................... | 340/5.72 |
| 2004/0195892 | A1 * | 10/2004 | Daniels ....................... | 297/378.1 |
| 2004/0262971 | A1 * | 12/2004 | Hentges et al. .......... | 297/378.12 |
| 2005/0132180 | A1 * | 6/2005 | Parker ................................ | 713/1 |
| 2005/0218710 | A1 * | 10/2005 | Browne et al. ........... | 297/452.64 |
| 2005/0219036 | A1 * | 10/2005 | Ueda et al. .................... | 340/5.62 |
| 2005/0248302 | A1 * | 11/2005 | Garland ........................ | 318/280 |
| 2006/0061315 | A1 * | 3/2006 | Schmidt et al. ............ | 318/568.1 |
| 2006/0131911 | A1 * | 6/2006 | Lim et al. .................... | 296/26.08 |
| 2007/0067083 | A1 * | 3/2007 | Shen et al. ....................... | 701/49 |
| 2007/0235297 | A1 * | 10/2007 | Stoschek et al. .............. | 200/5 R |
| 2007/0236067 | A1 * | 10/2007 | Nathan et al. ............ | 297/378.12 |
| 2007/0246285 | A1 * | 10/2007 | Browne et al. ................ | 180/273 |
| 2007/0246979 | A1 * | 10/2007 | Browne et al. ........... | 297/216.12 |
| 2008/0129100 | A1 * | 6/2008 | Szablewski ................... | 297/391 |
| 2009/0174243 | A1 * | 7/2009 | Nathan et al. ................. | 297/325 |
| 2009/0218858 | A1 * | 9/2009 | Lawall et al. .............. | 297/216.1 |
| 2009/0218859 | A1 * | 9/2009 | Lawall et al. .............. | 297/216.1 |
| 2011/0215628 | A1 * | 9/2011 | Hentges et al. .......... | 297/378.12 |
| 2011/0301809 | A1 * | 12/2011 | Pywell et al. ................... | 701/36 |

* cited by examiner

*Primary Examiner* — Calvin Cheung
*Assistant Examiner* — Krishnan Ramesh
(74) *Attorney, Agent, or Firm* — Quinn Law Group, PLLC

(57) ABSTRACT

A seat assembly includes a first member. There is a second member located proximate to the first member. A latch mechanism is located between the first member and the second member and is configured to selectively prevent movement of the second member relative to the first member. A latch release switch is positioned on the seat assembly and is configured to send a first signal when a user applies an adjustment force at a seat adjustment location. A controller is connected to the latch release switch and a latch release actuator and is configured to receive the first signal from the latch release switch and in response to generate an activation signal. The latch release actuator is activated in response to the activation signal to move the latch mechanism to a released position to allow relative movement between the first member and the second member.

20 Claims, 2 Drawing Sheets

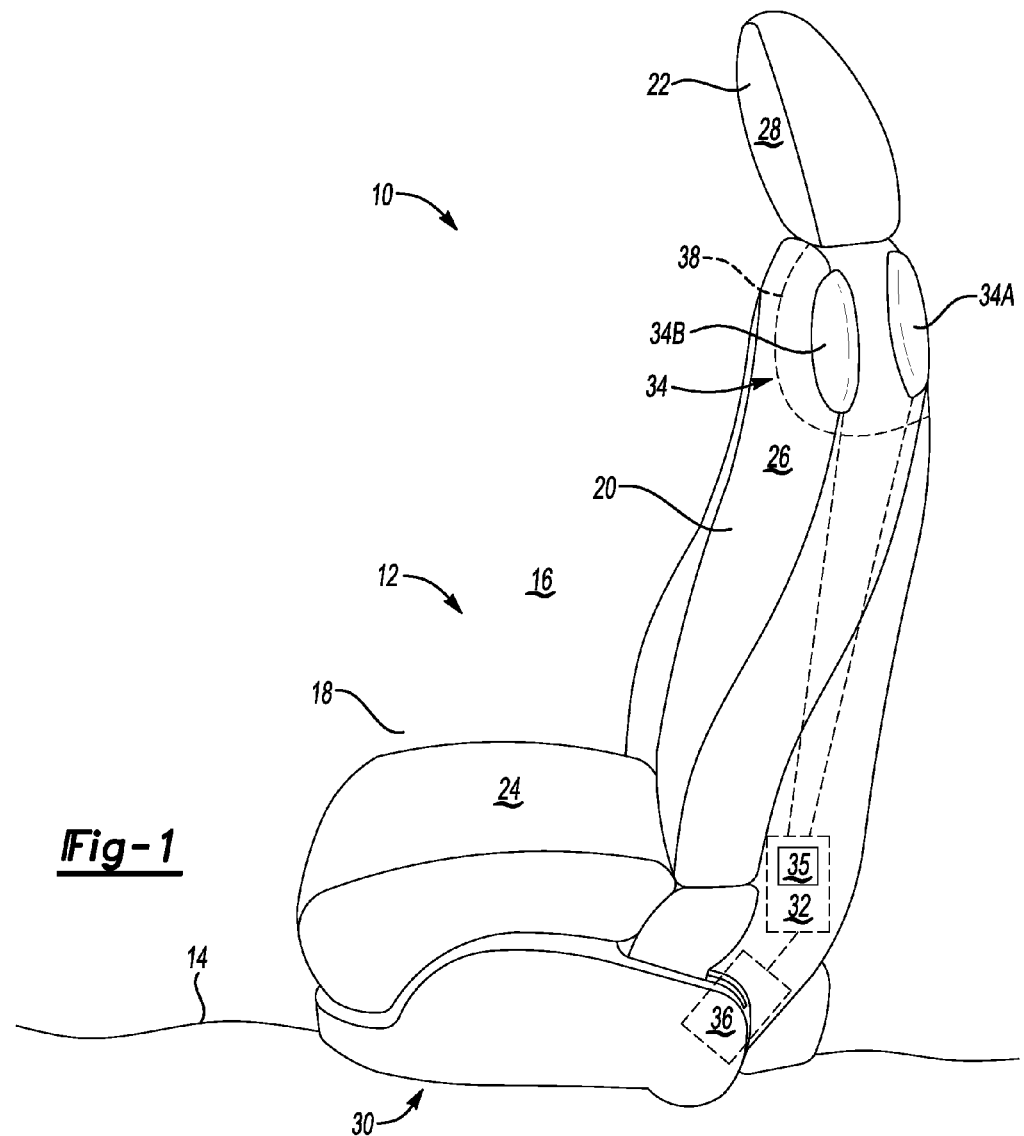
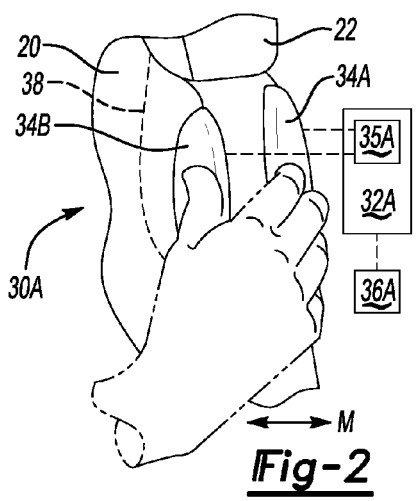
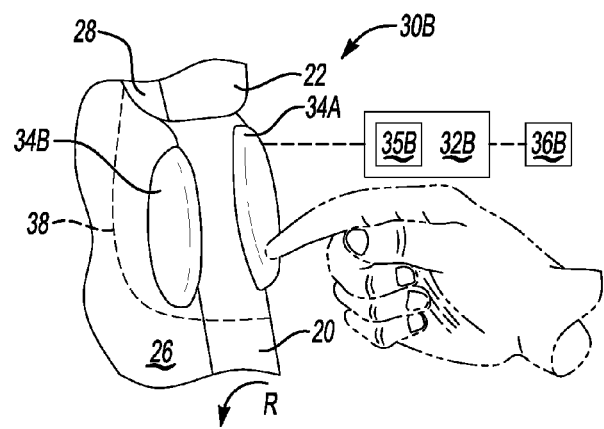
Fig-1
Fig-2
Fig-3

TOUCH SENSITIVE CONTROL FOR A LATCH MECHANISM

TECHNICAL FIELD

The present invention relates, generally, to latch mechanisms for vehicles.

BACKGROUND OF THE INVENTION

Seat assemblies in vehicles are typically adjustably attached to the vehicle. Seats are adjustable to a variety of positions and configurations. Seat adjustment systems include latch mechanisms which prevent seat adjustment at undesired times. In order to adjust a seat a vehicle occupant must first release the latch mechanism, and maintain the latch mechanism in the released position during adjustment of the seat. For example, a seat back may be adjusted relative to a seat bottom to fold forward for passenger access to areas located rearward of the seat in the vehicle. A latch mechanism must be released and maintained in that configuration while the seat is being adjusted from one position to another.

Typically, both the latch mechanism release and the adjustment of the seat are actuated by user effort, specifically, the moment arm of the latch release lever. Therefore, the latch mechanism may have a larger handle with a lower latch release effort to reduce the effort required by the user, or may have a smaller handle to utilize packaging space within the vehicle. However, this will increase the latch release effort required by the user. Therefore, the user needs to perform two separate motions, one to release the corresponding latch mechanism and the other to re-position or re-configure the seat. Often, these two motions require efforts to be applied in different directions, which make the task of re-positioning or re-configuring the seat challenging especially for a user with restricted mobility or limb strength.

SUMMARY OF THE INVENTION

An adjustment system operable for use with a seat assembly includes a first member and a second member that is located proximate to the first member. A latch mechanism is located between the first member and the second member. The latch mechanism is configured to selectively prevent movement of the second member relative to the first member. A latch release actuator is connected to the latch mechanism. A latch release switch is positioned on the seat assembly in a predetermined seat adjustment location and is configured to send a first signal when a user applies an adjustment force at the seat adjustment location. A controller is connected to the latch release switch and the latch release actuator. The controller is configured to receive the first signal from the latch release switch and in response to generate an activation signal which activates the latch release actuator. The latch release actuator is activated in response to the activation signal from the controller to move the latch mechanism from a locked position to a released position to allow relative movement between the first member and the second member when a user applies force at the seat adjustment location.

A method for selectively adjusting a seat assembly includes sending an activation signal to a latch release actuator in response to a user touching a switch on the seat assembly. A stimulus is applied to an active material element for the latch release actuator to change at least one property of the active material element and thereby move a latch mechanism located between a first member and a second member to a released position in response to the signal. The position of the second member relative to the first member may then be adjusted.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a perspective schematic view of a seat assembly having a first embodiment of an adjustment system;

FIG. 2 is a partial perspective schematic view of a latch release switch for the adjustment system of FIG. 1 illustrated in a first position;

FIG. 3 is a partial perspective schematic view of the latch release switch for the adjustment system of FIG. 1 illustrated in a second position;

DESCRIPTION OF THE PREFERRED EMBODIMENTS

Figures 4, 5:
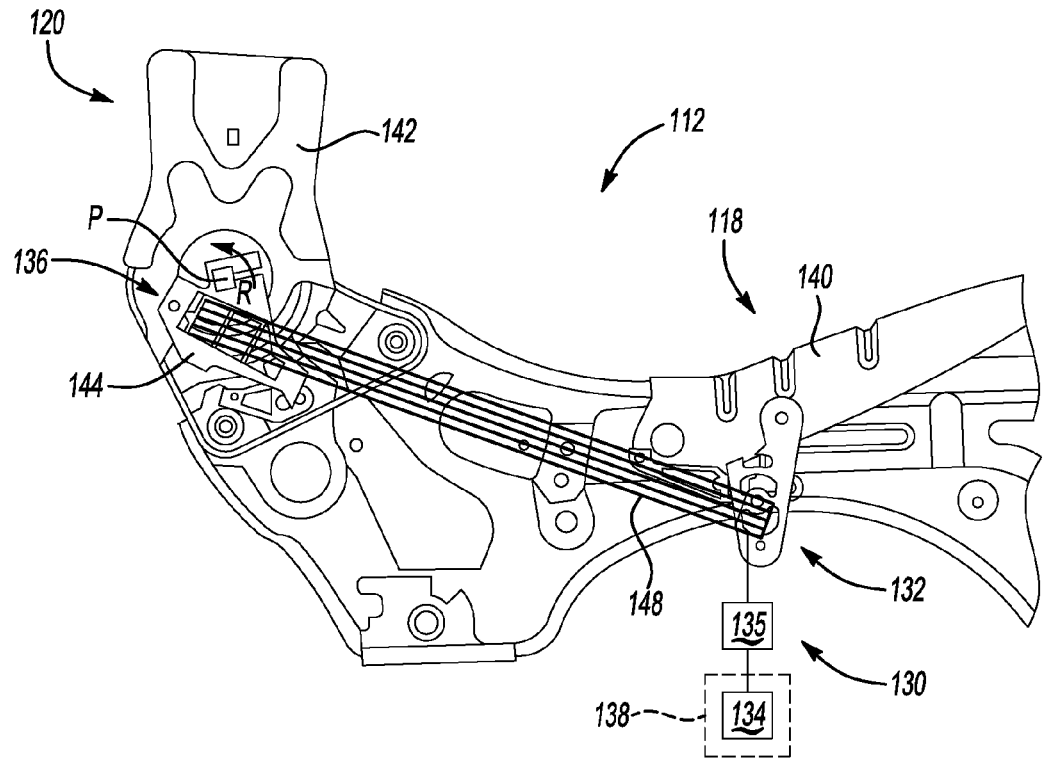
FIG. 4 is a side schematic view of an embodiment of a latch release actuator for the adjustment system of FIG. 1.
FIG. 5 is a schematic illustration of an embodiment of a latch release switch for the adjustment system of FIG. 1.

Referring to the drawings, wherein like reference numbers refer to like components, FIG. 1 schematically depicts a vehicle 10 having a seat assembly 12 mounted to a floor 14 of the vehicle 10. The vehicle 10 defines a passenger compartment 16 in which the seat assembly 12 is disposed. The seat assembly 12 includes a first member 18. A second member 20 is located proximate to the first member 18 and may be another member of the seat assembly 12 or part of the vehicle 10. In the embodiment shown in FIG. 1, the first member 18 is a lower seat portion and the second member 20 is a seatback portion. The first member 18 and the second member 20 may be any members that are adjustable relative to one another. A latch mechanism 36 is located between the first member 18 and the second member 20 to selectively prevent movement of the second member 20 relative to the first member 18. In the embodiment shown in FIG. 1, the latch mechanism 36 selectively prevents movement of the second member (or seatback portion) 20 relative to the first member (or lower seat portion) 18.

The seat assembly 12 also includes a headrest assembly 22. The first member (or lower seat portion) 18 defines a generally horizontally-oriented surface 24 for supporting an occupant (not shown). The second member (or seatback portion) 20 is mounted with respect to the first member 18, and defines surface 26 for supporting the back of the occupant. The second member 20 is adjustable with respect to the first member 18 so that the reclination angle is selectively variable by the occupant. In addition to the reclination angle, the second member 20 may be rotatably adjustable in a forward manner to allow the occupant access to the passenger compartment 16 behind the seat assembly 12. As used herein, the "forward direction" of orientation refers to the direction an occupant of the seat assembly 12 would be facing when seated with their back against surface 26. Other directions described herein follow the same frame of reference. The seat assembly 12 may be in any position within a vehicle 10, such as, a front row or rear row seat. Additionally, the second member 20 may also be positioned in a "fold flat" manner to provide an adjustable storage arrangement. As used herein, the term "fold flat" generally refers to the seatback portion of the seat assembly 12 arranged in a generally parallel configuration with the surface 24 of the lower seat portion.

The headrest assembly 22 is mounted to the upper end of the second member 20. The headrest assembly 22 is depicted as a separate member from the second member 20. However, it should be noted that, within the scope of the claimed invention, a headrest assembly 22 may be an integral part of a second member 20 as understood by those skilled in the art. For example, a headrest 22 may be the upper portion of the second member 20. The headrest assembly 22 defines a surface 28 that faces generally the same direction as surface 26 for supporting the back of the occupant's head. The headrest assembly 22 may be adjustable with respect to the second member 20 so that the support height is selectively variable by the occupant. Additionally, the headrest assembly 22 may be adjustable in a forward manner to allow the headrest assembly 22 to fold forward as necessary, for example to accommodate positioning the second member (or seatback portion) 20 in the "fold flat" manner.

Other configurations and manners of adjustment between the first member 18 and the second member 20 of the vehicle 10 may be contemplated, for example, but not limited to adjustment of the seat assembly 12, the lower seat portion, the seatback portion, and the headrest assembly 22 in the fore and aft direction, height, reclination angle, headrest height and angle, and folding of the seatback portion. One skilled in the art would be able to determine the number and combinations of adjustments between the first member 18 and the second member 20.

The seat assembly 12 includes at least one adjustment system 30. The adjustment system 30 includes at least one latch release actuator 32, at least one latch release switch 34, and at least one latch mechanism 36. The latch release actuator is connected to the latch mechanism 36 for moving the latch mechanism 36 from a locked position to a released position, as described in further detail below. The latch release actuator 32 includes a controller 35. In the embodiment shown in FIG. 1, the latch release actuator 32 and the controller 35 are illustrated schematically as being located in the second member 20. The latch release actuator 32 and the controller 35 may, alternatively, be located in the first member 18, as illustrated in the embodiment shown in FIG. 4. The latch release switch 34 is connected to the latch release actuator 32 to send at least a first signal to the controller 35. The controller 35 receives the first signal from the latch release switch 34 and generates an activation signal for the latch release actuator 32 to activate the latch release actuator 32 to release the associated latch mechanism 36. That is, in response to the first signal from the latch release switch 34, the controller 35 can command the latch release actuator 32 to move the latch mechanism 36 from the locked position to the released position. In the embodiment shown, a first latch release switch 34A and a second latch release switch 34B are illustrated. Each seat assembly 12 may include multiple latch release actuators 32 which may be activated by one or more latch release switches 34 acting independently or in combination as described below. Each latch release actuator 32 may include a controller 35.

The latch release switch 34 is positioned relative to the seat assembly 12 in a seat adjustment location 38. The seat adjustment location 38 is a location on the seat assembly 12 which would commonly be touched by the user during adjustment of the seat assembly 12. One skilled in the art would be able to determine an appropriate seat adjustment location 38 based upon typical user seat adjustment methods and ergonomics. The seat adjustment location 38 for each latch release switch 34 is particular to the associated adjustment and latch release actuator 32. For example, to translate a seat assembly 12 relative to the floor 14 of the vehicle 10 a user may, typically, touch an upper corner of the second member (or seatback portion) 20 to manipulate the seat assembly 12 to the desired position. Therefore, the seat adjustment location 38 (illustrated in phantom) would be located on the upper corner of the second member 20. In FIG. 1, the latch release switch 34B is located in the seat adjustment location 38 described above. The latch release switch 34B is connected to the latch release actuator 32 for releasing the latch mechanism 36 to allow adjustment of the seat assembly 12. The user may adjust the seat assembly 12 by applying force with the same touch that is activating the latch release switch 34 to release the latch release actuator 32. Therefore, only one touch is required to both release the latch mechanism 36 and cause relative movement between the first member 18 and the second member 20 to adjust the seat assembly 12. This results in an intuitive and easier-to-use interface for adjusting the position/configuration of a seat.

The latch release switch 34 may be integrated into an existing trim or structural component of the seat assembly 12 thereby eliminating handles/levers and creating an aesthetically pleasing and clutter-free appearance to the seat assembly 12.

There may be multiple seat adjustment locations 38 associated with a particular type of adjustment for the seat assembly 12 since a user may commonly choose several positions to touch the seat assembly 12 for that particular adjustment. Latch release switches 34 may be located at any or all of the latch release locations 38 and connected to the latch release actuator 32 for that particular seat assembly 12 adjustment. One skilled in the art would be able to determine the appropriate seat adjustment location 38 and number of latch release switches 34 for a particular latch release actuator 32. When the user has completed adjustment of the seat assembly 12 and has released the latch release switch 34, e.g. the user is no longer touching the switch's active surface, the latch release actuator 32 is de-actuated, and the latch mechanism 36 returns to the locked position.

When the user touches the seat assembly 12 for adjustment the associated latch release switch 34 at that location is activated. The latch release switch 34 sends a first signal to the latch release controller 35. The controller 35 then generates an activation signal for the latch release actuator 32 to release the latch mechanism 36 based on an internal control logic. The user may then adjust the seat assembly 12 by applying force with the same touch that is releasing the latch mechanism 36. The latch release actuator 32 provides the force required to release the latch mechanism 36. Therefore, the user's effort applied to change the seat assembly's position or configuration, e.g. move the second member 20 relative to the first member 18, itself provides the input necessary to release the latch mechanism 36 that selectively constrains that particular degree of freedom. By using strategically located touch sensitive latch release switches 34 in conjunction with an active materials based latch release actuator 32, the above embodiment not only spares the user the need to supply the latch release effort but also allows the user to perform the latch release and seat assembly 12 re-positioning or configuration in a single, intuitive motion. Any additional force that is applied is used to adjust the seat assembly 12. Therefore, the user effort for latch release is minimal and overall effort for adjustment of the seat assembly 12 is reduced. Other arrangements for reducing adjustment effort of the seat assembly 12 may also be utilized, for example arrangements which reduce friction while translating the seat assembly 12.

The controller 35 receives the first signal from the latch release switch 34 and utilizes signal conditioning and logic to interpret the user intention from multiple simultaneous touches sensed at different latch release switch 34 locations. The signal conditioning by the controller 35 may enable acquisition of the first signal, from the latch release switch 34, with a high signal-to-noise ratio over the entire operating range (temperature, humidity, etc) of the vehicle 10. The controller 35 may take into account not only the combination/subset of latch release switches 34 touched but also other related system factors. For example when the adjustment mechanism 235 is applied to a seat assembly 12 for a vehicle these factors may include but are not limited to: whether the vehicle in motion, position of child safety locks (i.e. has the primary user locked the seat position to prevent kids from moving the seats around), a condition/state of the active material based actuators to reliably operate the latch, available power to system to actuate the actuator, impediments to adjustment of the second member 20 (e.g. luggage), sensor malfunction, or other general safety information. This information is either sensed directly from a variety of sensors existing in the vehicle 10 or is inferred from indirect measurements via an algorithm. The information is may be provided to or collected by the controller 35 from other vehicle system employing the same information, or the controller 35 may employ any algorithms necessary to calculate the required data. Therefore, the control logic by the controller 35 may aggregate a variety of factors in addition to registering the touches and interpreting user intent before acting on the sensed signals. The controller 35 may also employ logic that includes a learning algorithm that evolves/tunes the sensitivity etc of the latch release switches 34 to the use habits of one or more users. This may take the form of supervised or unsupervised learning. One skilled in the art would be able to determine an appropriate control logic and parameter of factors employed by the controller 35 for a particular adjustment system 30.

The latch release switch 34 may be a touch sensitive switch. That is a switch that responds to a user's touch with minimal or no force beyond the touch required to activate the switch. In fact, the touch sensitive switch may be able to detect the user's touch prior to the actual touching of the switch, e.g. by detecting a change in capacitance resulting from user proximity to the latch release switch 34. The touch sensitive latch release switch 34 may be a mechanical switch, e.g. a pressure or strain sensitive switch, that relays an electrical signal when the latch release switch 34 is activated. Alternatively, the touch sensitive latch release switch 34 may be a sensor, e.g. a piezo-based switch, which generates an electrical signal when the latch release switch 34 is activated. The signal from the latch release switch 34 is sent to the controller 35 for the latch release actuator 32. The controller 35 thereby generates an activation signal for the associated latch release actuator 32. The controller 35 may be connected to a main power supply (not shown) for the vehicle 10 to provide the power necessary to activate the latch release actuator 32. The latch release switch 34 may be an independent component that is in communication with the latch release actuator 32 directly, for example, through a wire electrically connecting the components. In this manner, the latch release switch 34 may easily be located remotely from the latch release actuator 32. Further, a small power supply may be sufficient for operating the latch release switch 34 and a larger power supply may be utilized to provide the power necessary to actuate the latch release actuator 32.

Referring to FIGS. 1-3, one embodiment of an adjustment system 30 is described. Each seat adjustment location 38 may have multiple seat assembly 12 adjustments associated therewith. For example, the upper corner of the seat assembly 12 may be touched to both rotate the second member (or seatback portion) 20 forward or to translate the seat assembly 12 relative the floor 14. Therefore, a latch release switch 34 may be connected to multiple latch release actuators 32 and multiple latch release switches 34 may be used in combination to release a particular latch release actuator 32.

In one embodiment, the latch release controller 35 maps a particular combination of latch release switches 34 that are touched by the user to move a particular adjustment feature, to a specific combination of actuators 32 that can release the latch mechanism 36 corresponding to the chosen adjustment feature, as explained in further detail below. The controller 35 may receive a signal from each of the latch release switches 34 and generate an activation signal which is sent to the appropriate latch release actuators 32. Alternatively, there is one latch controller 35 per latch mechanism 36 and each of the latch release switches 34 are connected to each of the controllers 35. Therefore, each latch controller 35 receives all the signals from the latch release switches 34, but the controller 35 only generates an activation signal for the associated latch mechanism 36, based on the receipt of a specific signal combination from the latch release switches 34.

FIG. 2 illustrates a first latch release system 30A. A first latch release actuator 32A may be activated to release a first latch mechanism 36A by touching both the first latch release switch 34A and the second latch release switch 34B simultaneously, as shown. Releasing the first latch mechanism 36A allows the seat assembly 12 to, for example, translate relative to the floor 14 (indicated by arrow M in FIG. 2) when the user applies force at the seat adjustment location 38. Actuating the first latch release actuator 32A to release the first latch mechanism 36A requires simultaneously touching the first latch release switch 34A and the second latch release switch 34B. Therefore, by touching only the first latch release switch 34A the first latch release actuator 32A would not actuate release of the first latch mechanism 36A.

FIG. 3 illustrates a second latch release system 30B for use with the same seat assembly 12 as illustrated in FIG. 2. A second latch release actuator 32B may be activated to release a second latch mechanism 36B by touching just the first latch release switch 34A, as shown. Releasing the second latch mechanism 36B allows the second member (or seatback portion) 20 to rotate forward relative to the first member (or lower seat portion) 18 (as indicated by arrow R in FIG. 3). A first controller 35A and a second controller 35B for the latch release systems 30A-B may be connected to the latch release switches 34A-B to verify which combination of the latch release switches 34A-B have been activated. When one of the controllers 35A-B determines that the associated latch release switch(es) 34A-B have been activated that controller 35A-B accordingly generates an activation signal for the associated latch release actuator 32A-B.

Alternatively, as discussed above, the same controller 35A-B may be connected to both the first latch release actuator 32A and the second latch release actuator 32B. The controller 35A-B may provide an activation signal to the appropriate latch release actuator 32A-B based upon the latch release switch(es) 34A-B that have been touched.

Therefore, a seat assembly 12 may have multiple adjustment systems 30A-B associated therewith, and each adjustment system 30A-B may have multiple latch release actuators 32A-B and multiple latch release switches 34A-B. One skilled in the art would be able to determine the number, position, and configuration of latch release actuators 32A-B and latch release switches 34A-B for a particular seat assembly 12.

FIG. 4 illustrates an embodiment of a latch release actuator 132 for use with a seat assembly 112 having an adjustment system 130 located between a first member 118 and a second member 120. The second member 120 is located proximate to the first member 118 and may be another member of the seat assembly 112. In the embodiment shown in FIG. 4, the first member 118 is a lower seat portion and the second member 120 is a seatback portion. The seat assembly 112 has a latch mechanism 136 which is located between a lower seat frame 140 for the first member 118 and a seatback frame 142 for the second member 120. The latch mechanism 136 selectively prevents movement of the second member 120 relative to the first member 118. The latch mechanism 136 includes a locking device, such as a lever 144 which is rotatably attached to the lower sear frame 140 and is rotatable about a pivot P. When the latch mechanism 136 is in the locked position (shown in FIG. 4) a member (not shown) of the latch mechanism 136 produces mechanical interference between parts connected to the lower seat portion 118 and the seatback portion 120 thereby preventing relative motion between these members. To release the latch mechanism 136 the lever 144 is rotated (as indicated by arrow R) about the pivot P to a released position. When the latch mechanism 136 is in the released position the first member 118 can rotate relative to the second member 120 is possible, when a user applies a force to the seat back portion 120.

Alternatively, the latch mechanism 136 may include a locking device in the form of a pin. The pin may be translatable between a locked position and a released position. When the pin is in the locked position the latch mechanism 136 would prevent relative movement between the first member 118 and the second member 120 and when the pin is in the released position the latch mechanism 136 would allow relative movement between the first member 118 and the second member 120. The latch mechanism 136 may also include other arrangements for selectively preventing movement between the first member 118 and the second member 120. One skilled in the art would be able to determine the appropriate latch mechanism 136 and associated locking device, such as a lever 144 or pin.

The latch mechanism 136 may include a biasing element (not shown), such as a torsion spring, to bias the lever 144 into the locked position. The latch release actuator 132 is attached to the latch release lever 144 and exerts a force on the lever 144 to overcome the biasing element and cause the latch mechanism 136 to be released. When the latch release actuator 132 is deactivated the biasing element moves the lever 144 back to the locked position.

The controller 135 generates an activation signal for the latch release actuator 132 to actuate release of the latch mechanism 136. The latch release actuator 132 rotates the lever 144 about the pivot P from the locked position to the released position. In the embodiment shown, the latch release actuator 132 includes an active material element 148. In the embodiment shown, the active material element 148 is a plurality of wires secured to the lower seat frame 140 and to the lever 144 at opposing ends. The active material element 148 is constructed at least partially of an active material such as a shaped memory alloy (SMA) or other active or "smart" material, as described in greater detail herein below. As used herein, and will be understood by those of ordinary skill in the art, the term "active material" refers generally to active material compositions having certain predetermined and variable properties, such as stiffness, shape, dimensions, and/or material morphology or structure that may be selectively modified by introducing an external stimuli or "activation signal". For example, the active material element may change in at least one of a physical and chemical attribute, such that the change of the at least one physical and chemical attribute manifests in an ability of the active material element to apply a force against an external load. The physical or chemical attribute may include at least one of a change in phase fractions, microstructure, morphology, storage modulus, loss modulus, density, electrical resistivity, moisture permeability, molecular charge distribution, molecular dipole orientation distribution. Therefore, the activation signal may be at least one of a thermal activation signal, an electric activation signal, a magnetic activation signal, an electro-magnetic activation signal, a mechanical activation signal (e.g. an ultra sonic vibrations), and a chemical activation signal.

Stimuli may include, but are not limited to, applied electrical and/or magnetic fields, photo-chemical activation, external stresses, temperature fluctuations, moisture, and/or pH changes, or combinations thereof. For example, an energy source (not shown) may be connected to the active material element 148 to selectively provide electrical current to the active material to generate the necessary heat for inducing a solid-state phase transformation, and/or to induce an electric and/or magnetic field around the active material, depending upon the application and the particular active material element 148.

Many active material components may be useable within the scope of the invention. Exemplary shape memory materials include shape memory alloys (SMAs), electroactive polymers (EAPs) such as dielectric elastomers, ionic polymer metal composites (IPMC), piezoelectric polymers and magnetic shape memory alloys (MSMA), piezoelectric materials, electro-strictive materials, and/or magneto-strictive materials, composites of the foregoing shape memory materials with non-shape memory materials, and combinations comprising at least one of the foregoing shape memory materials. The EAPs, piezoceramics, baroplastics, and the like can be employed in a similar manner as the shape memory alloys described herein, as will be appreciated by those skilled in the art in view of this disclosure.

Shape memory alloys (SMA), which are sometimes referred to in the art informally as "smart materials", are materials or compositions exhibiting pseudo-elasticity and shape memory, and thus have the ability to "remember" their original shape. The original shape may be recalled subsequent to a deformation that changes its shape by applying an external stimulus (i.e., an activation signal). As such, deformation of the shape memory material from the original shape can be a temporary and reversible condition. These capabilities are due, in part, to a temperature and stress-dependent solid-state change of phase due to a cooperative atomic rearrangement. The two phases, i.e. the Martensite (m) phase and the Austenite (a) phase, refer to the lower and higher temperature phases, respectively, in which the phase transformation on heating occurs from a low-symmetry (Martensite) to a highly symmetric (Austenite) crystallographic structure. SMAs represent a class of thermally-activated smart materials (TASM) that undergo a reversible phase transformation responsible for stress-induced and temperature-induced recoverable deformation behavior.

Electro-active Polymers (EAP) include polymeric materials which respond in a particular manner to external electrical stimulation, such as an applied voltage, by a change of shape and/or size. Consequently, EAP are capable of converting electrical energy to a mechanical force and/or movement, and vice versa. EAP may be divided in two primary classes:

dielectric EAP, in which actuation is caused by electrostatic forces between two electrodes which squeeze the polymer, and ionic EAP, in which actuation is caused by the conformational changes produced by the displacement of ions inside the polymer.

Piezoelectric materials are materials, traditionally crystalline structures and ceramics, which produce a voltage when a mechanical stress is applied thereto. Since this effect also applies in the reverse manner, a voltage applied across a sample piezoelectric material will produce a mechanical stress within the sample. For example, activation of a piezoelectric material can result in a change in dimension of approximately 0.1% for piezo-ceramics and 1% for piezo-polymers. Suitably designed structures made from these materials can therefore be made that bend, expand, or contract when a voltage is applied thereto.

Active materials may also be magneto-strictive or electro-strictive. The term "magneto-strictive" refers to the mechanical deformation that occurs in a ferromagnetic material when it is placed in a magnetic field. Active materials may therefore be selected with desired magneto-strictive properties so that they may change their length in a desired fashion when subjected to an induced electromagnetic field. Likewise, electro-strictive materials may change their stiffness or strain in response to an applied voltage.

Accordingly, the active material element 148 may be constructed partially or fully of an active material component having predetermined properties, for example a variable length or stiffness value that varies actively in response to an applied stimulus, such as resistive heating or a voltage. In the embodiment shown, the active material element 148 may be constructed entirely of SMA wires that remain in a martensitic phase when the lever 144 is in the locked position, unless and until the active material element 148 is heated above a characteristic temperature. When the active material element 148 is heated to a temperature exceeding the characteristic temperature, a solid-state transformation occurs, and active material element 148 enters the austenite phase.

The active material element 148 is configured such that the wires are characterized by tensile strain when the lever 144 is in the locked position. The latch release switch 134 is connected to the active material element 148 through the controller 135 for the latch release actuator 132, which applies an activation signal to the active material element 148. The SMA wires are chosen to have a permanent shape corresponding to a length that is shorter than the SMA wire length when the latch mechanism 136 is engaged. When the active material element 148 transforms to the austenite phase, the SMA wires recover their permanent length. This requires the lever 144 to rotate by an angle that is sufficient to release the latch mechanism 136. Thus, when the active material element 148 is heated to the austenite phase, the wires decrease in length, exerting sufficient force to cause rotation of the lever 144 about the pivot P. Heating of the active material element 148 may be achieved by Joule, radiation, convection, or other suitable heating methods, and the active material element 148 thereby exerts a force on the lever 144 to cause rotation. The force generated by the active material element 148 is sufficient to overcome the biasing force, as well as other system losses such as friction. The rotation of the lever 144 releases the latch mechanism 136 allowing motion of the second member 120 relative to the first member 118. A user may than adjust the second member 120 relative to the first member 118 by applying force at the latch release switch 134, which is located within the seat adjustment location 138.

When the activation signal to the latch release actuator 132 is deactivated the lever 144 is biased to rotate back to the locked position (shown in FIG. 4). Additionally, the biasing element may provide tension to active material element 148 for stretching the active material element 148 back to its initial or de-energized length.

Shape memory alloy wires are employed in the embodiment herein. However, shape memory materials and other active materials may be employed in a variety of other forms within the scope of the claimed invention, such as strips, sheets, slabs, foam, cellular and lattice structures, helical or tubular springs, braided cables, tubes or combinations comprising at least one of the forgoing forms can be employed in a similar manner as will be appreciated by those skilled in the art in view of this disclosure.

FIG. 5 illustrates an embodiment for a latch release switch 234. The latch release switch 234 is located on a seat assembly 212 in a seat adjustment location 238. The latch release switch 234 is a touch sensitive switch. The latch release switch 234 includes a sensor 250. The sensor 250 may be located beneath or integrated into the seat trim 252 or other structure of the seat assembly 212. The seat trim 252 would assist in protecting the sensor 250 and may provide a smooth surface to be aesthetically pleasing. In the embodiment shown, the sensor 250 is a capacitive sensor to sense the change in capacitance from the user's finger or hand when the user touches the latch release switch 234. In the embodiment shown, the sensor 250 is incorporated within a printed circuit board (PCB) or a flexible circuit board 256. The change in capacitance recorded by the sensor 250 is converted into a digital signal with a sensor converter 254 that is electrically connected to the sensor 250 and the PCB 256. The sensor converter 254 sends the digital signal that is generated to a controller 235 of a latch release actuator 232 to actuate release of the associated latch mechanism 236 that is located between a first member 218 and a second member 220 to allow movement of the second member 220 relative to the first member 218.

The controller 235 generates the activation signal in response to the signal from the latch release switch 234. The controller 235 receives the first signal from the latch release switch 234 and utilizes signal conditioning and logic to interpret the user intention from multiple simultaneous touches sensed at different latch release switch 234 locations. The signal conditioning by the controller 235 may enable acquisition of the first signal, from the latch release switch 234, with a high signal-to-noise ratio over the entire operating range (temperature, humidity, etc) of the vehicle. The controller 235 may take into account not only the combination/sub-set of latch release switches 234 touched but also other related system factors. For example when the adjustment mechanism 235 is applied to a seat assembly 12 for a vehicle these factors may include but are not limited to: whether the vehicle in motion, position of child safety locks (i.e. has the primary user locked the seat position to prevent kids from moving the seats around), a condition/state of the active material based actuators to reliably operate the latch, available power to system to actuate the actuator, impediments to adjustment of the second member 20 (e.g. luggage), sensor malfunction, or other general safety information. This information is either sensed directly from a variety of sensors existing in the vehicle or is inferred from indirect measurements via an algorithm. The information is may be provided to or collected by the controller 235 from other vehicle system employing the same information, or the controller 235 may employ any algorithms necessary to calculate the required data. Therefore, the control logic by the controller 235 may aggregate a variety of factors in addition to registering the touches and interpreting user intent before acting on the sensed signals. The controller 235 may also employ logic that includes a learning algorithm that evolves/tunes the sensitivity etc of the latch release switches 234 to the use habits of one or more users. This may take the form of supervised or unsupervised learning. One skilled in the art would be able to determine an appropriate control logic and parameter of factors employed by the controller 235 for a particular adjustment system 230.

The latch release switch 234 only requires a minimal power supply to convert the capacitance to a signal and forward that to the controller 235. The latch release switch 234 may easily be located on the seat assembly 212 in a remote location from the latch release actuator 232 and requires only that the latch release switch 234 be in communication with the controller 235 to send the sensor signal. The latch release actuator 232 may have a separate power source to actuate release of the latch mechanism 236.

As discussed above, the seat assembly 12, 112, 212 may have multiple adjustment systems 30A-B, 130, 230 associated therewith, and each adjustment system 30A-B, 130, 230 may have multiple latch release switches 34A-B, 134, 234 for activating multiple latch release actuators 32A-B, 132, 232 to release an associated latch mechanism 36A-B, 136, 236 located between a first member 18, 118, 218 and a second member 20, 120, 220. Although several examples of adjustment systems 30A-B, 130, 230 have been illustrated, one skilled in the art would be able to contemplate other configurations of adjustment systems 30A-B, 130, 230 for adjusting a second member 20, 120, 220 relative to a first member 18, 118, 218. Additionally, other numbers, positions, and configurations of latch release actuators 32, 132, 232 and latch release switches 34, 134, 234 for adjustment of a particular seat assembly 12, 112, 212 than those discussed herein may also be contemplated. Further, the adjustment systems 30A-B, 130, 230, latch release switches 34, 134, 234, and latch release actuators 32A-B, 132, 232 may be incorporated into other vehicle latching components, such as a group including, doors, hatches, tailgates, decklids, sunroofs, interior storage components, including the center console, glove box, sun visors, etc. Non-automotive applications which utilize latching systems may also benefit from the adjustment system 30A-B, 130, 230 described herein.

While the best modes for carrying out the invention have been described in detail, those familiar with the art to which this invention relates will recognize various alternative designs and embodiments for practicing the invention within the scope of the appended claims.

The invention claimed is:

1. A seat assembly comprising:
a first member of the seat assembly;
a second member located proximate to the first member;
a latch mechanism operatively connected between the first member and the second member, wherein the latch mechanism is configured to selectively prevent movement of the second member relative to the first member;
a latch release actuator connected to the latch mechanism;
at least one latch release switch positioned on the seat assembly in a predetermined seat adjustment location defined by one of the first and second members;
wherein the at least one latch release switch is configured to send a latch release signal in response to an adjustment force applied by a user at the seat adjustment location;
a controller connected to the at least one latch release switch and the latch release actuator, wherein the controller is configured to receive the latch release signal from the at least one latch release switch and in response to generate an activation signal which activates the latch release actuator; and
wherein the latch release actuator is activated in response to the activation signal from the controller to move the latch mechanism from a locked position to a released position;
wherein with the latch mechanism in the released position at least one of the first member and the second member is manually moveable relative to the other of the first member and the second member by the adjustment force applied by the user at the seat adjustment location.

2. The seat assembly of claim 1, wherein the latch release actuator includes an active material element.

3. The seat assembly of claim 2, wherein the active material element comprises at least one of a shape memory alloy, a ferromagnetic shape memory alloy, an electroactive polymer, and a piezoelectric material.

4. The seat assembly of claim 2, wherein the active material element is configured to be activated by an activation signal that comprises at least one of a thermal activation signal, an electric activation signal, a magnetic activation signal, an electro-magnetic activation signal, a mechanical activation signal and a chemical activation signal.

5. The seat assembly of claim 2, wherein the active material element changes in at least one of a physical and chemical attribute, such that the change of the at least one physical and chemical attribute manifests in an ability of the active material element to apply a force against an external load, and wherein the at least physical and chemical attribute includes at least one of a change in phase fractions, microstructure, morphology, storage modulus, loss modulus, density, electrical resistivity, moisture permeability, molecular charge distribution, and molecular dipole orientation distribution.

6. The seat assembly of claim 1, wherein the latch release switch is a touch sensitive switch.

7. The adjustment system of claim 6, wherein the latch release switch is able to detect a touch prior to the user touching the switch surface.

8. The seat assembly of claim 1, wherein the second member includes a backrest portion of the seat assembly; and
the latch release switch is located on the backrest portion.

9. The seat assembly of claim 1, wherein the at least one latch release switch is a plurality of latch release switches; and wherein the controller is operable to generate the activation signal when the latch release signal is received from each of the multiple latch release switches.

10. The seat assembly of claim 1, wherein the at least one latch release switch includes a first latch release switch configured to send a first latch release signal and a second latch release switch configured to send a second latch release signal; and
wherein the controller is operable to generate the activation signal only when the first and second latch release signals are simultaneously received by the controller.

11. An adjustment system for a vehicle comprising:
a first member;
a second member located proximate to the first member;
a latch mechanism operatively connected between the first member and the second member, wherein the latch mechanism is configured to selectively prevent movement of the second member relative to the first member;
a latch release actuator connected to the latch mechanism, wherein the latch release actuator includes an active material element having a variable property;
at least one latch release switch positioned on the second member in a predetermined adjustment location and configured to send a latch release signal when a user touches the predetermined adjustment location;

a controller connected to the at least one latch release switch and the latch release actuator, wherein the controller is configured to receive the latch release signal from the at least one latch release switch and in response to generate an activation signal which activates the latch release actuator; and wherein the activation signal from the controller applies a stimulus sufficient for varying the variable property of the active material element, to thereby move the latch mechanism from a locked position to a released position to allow manual movement of one of the first member and the second member relative to the other of the first member and the second member with the same touch the user is applying at the predetermined adjustment location.

12. The adjustment system of claim 11, wherein the active material element comprises at least one of a shape memory alloy, a ferromagnetic shape memory alloy, an electroactive polymer, and a piezoelectric material.

13. The adjustment system of claim 11, wherein the latch release switch is a touch sensitive switch.

14. The adjustment system of claim 11, wherein the latch release switch is able to detect a touch prior to the user touching the switch surface.

15. The adjustment system of claim 11, wherein the adjustment system is for a seat assembly of the vehicle.

16. The adjustment system of claim 11, wherein the controller includes a learning algorithm configured to tune the sensitivity of the at least one latch release switch.

17. A method for selectively adjusting a seat assembly comprising:

sending, by a controller, an activation signal to a latch release actuator in response to a user touch applied to at least one latch release switch on the seat assembly; and applying a stimulus to an active material element for the latch release actuator to change at least one property of the active material element and thereby move a latch mechanism located between a first member and a second member to a released position in response to the activation signal such that with the latch mechanism in the released position, the position of the second member relative to the first member is manually adjustable by the user touch applied to the at least one latch release switch.

18. The method of claim 17, further comprising the controller sending the activation signal to move the latch mechanism to a locked position when the touch is removed from the switch.

19. The method of claim 17, further comprising generating the activation signal with the controller in response to touching multiple latch release switches associated with the latch mechanism.

20. The method of claim 17, wherein the at least one related system factor is one of a condition of the active material based actuators to reliably operate the latch, and a sensor malfunction.

* * * * *